United States Patent [19]
Craft

[11] Patent Number: 5,383,543
[45] Date of Patent: Jan. 24, 1995

[54] TRANSMISSION MAINSHAFT THRUST WASHER AND RETAINER RING COMBINATION

[75] Inventor: Robert B. Craft, Battle Creek, Mich.

[73] Assignee: Eaton Corporation, Cleveland, Ohio

[21] Appl. No.: 128,283

[22] Filed: Sep. 29, 1993

[51] Int. Cl.6 .......................... F16D 21/02; F16H 3/08
[52] U.S. Cl. .................... 192/48.8; 192/109 R; 74/331; 74/410
[58] Field of Search .................. 192/109 R, 48.8; 74/331, 332, 333, 339, 392, 397, 398, 410

[56] References Cited

U.S. PATENT DOCUMENTS

| | | | |
|---|---|---|---|
| 2,397,905 | 4/1946 | Acton et al. | 308/135 |
| 3,237,472 | 1/1966 | Perkins et al. | 74/331 |
| 3,425,290 | 2/1969 | Perkins | 74/331 |
| 3,500,695 | 3/1970 | Keiser | 74/331 |
| 3,894,621 | 7/1975 | Quick | 192/109 R |
| 4,034,620 | 7/1977 | McNamara et al. | 74/410 |
| 4,104,928 | 8/1978 | Vandervoort | 74/410 X |
| 4,423,643 | 1/1984 | McNamara | 74/331 |
| 4,485,686 | 12/1984 | Olmstead, Jr. et al. | 74/331 |
| 4,619,150 | 10/1986 | Niggenhauser | 74/332 |
| 4,949,589 | 8/1990 | Reynolds | 74/363 |
| 5,062,313 | 11/1991 | Fletcher | 74/333 X |
| 5,161,423 | 11/1992 | Ore | 74/339 |
| 5,179,866 | 1/1993 | Reynolds et al. | 74/332 |
| 5,269,194 | 12/1993 | Reynolds | 74/333 X |

Primary Examiner—Andrea L. Pitts
Attorney, Agent, or Firm—Albert E. Chrow; Howard D. Gordon

[57] ABSTRACT

A thrust washer and retainer ring combination is provided for a vehicular transmission (100) of the type having adjacent mainshaft gears (12) and (18) floating about a mainshaft (2) that have respective flanges (40) and (42) extending radially inwardly theretowards. A thrust washer (32) is disposed in a groove (38) between flanges (40) and (42) and a pair of retainer rings (28) and (30) are respectively disposed in grooves (34) and (36) adjacent a side of flanges (40) and (42) facing away from each other to prevent gears (12) and (18) from moving axially away from each other. Retainer rings (28) and (30) have an axial width "X" that is greater than the axial width "Y" of thrust washer (32) such that thrust washer (32) cannot be inadvertently received into retainer ring grooves (34) and (36) and the radial height of thrust washer (32) is preferably high enough to prevent it from being received into retainer ring grooves (34) and (36).

2 Claims, 2 Drawing Sheets

TRANSMISSION MAINSHAFT THRUST WASHER AND RETAINER RING COMBINATION

INTRODUCTION

This invention relates generally to an improved combination of a thrust washer and a pair of retainer rings operative to transmit axial thrust to the mainshaft of a vehicular transmission that has been selectively imparted to one of a pair of adjacent gears during the process of clutching the gear to the mainshaft.

BACKGROUND OF THE INVENTION

Transmissions featuring floating transmission mainshaft gears such as associated with twin countershaft transmissions are well known and examples of which can be found in U.S. Pat. Nos. 3,237,472; 3,238,613; 3,425,290; and 3,885,446, the disclosures of which are incorporated herein by reference.

Such transmissions generally feature a plurality of floating mainshaft gears that encircle the mainshaft and are supported and driven by countershaft gears, typically two countershaft gears, that are mounted on a pair of countershafts disposed spaced-apart parallel relationship on opposite sides of the mainshaft.

The mainshaft gears are characteristically clutched to the mainshaft by means of a clutch mechanism that slides along external splines extending axially along the mainshaft and has radially outwardly extending teeth or splines that meshingly engage internal teeth or splines on the mainshaft gear so as to cause rotation of the mainshaft when the mainshaft gear is clutched thereto.

A problem, long ago recognized, has been the potential for transfer of axial thrust to a floating mainshaft gear closely adjacent to the floating mainshaft gear being clutched to a mainshaft by an axially moving clutch assembly. In view of such, a variety of solutions have been devised over past years for transmitting axial thrust to the mainshaft that has been imparted to a mainshaft gear by an axially moving clutch mechanism rather than the mainshaft gear adjacent the gear being clutched to the mainshaft.

Such solutions have generally been in the form of gear retainer(s) of one type or another that characteristically limit axial movement of the mainshaft gears to prevent them from engaging each other whether or not one of them is being clutched to the mainshaft.

One example of a retainer assembly for limiting axial movement of a transmission gear is disclosed in U.S. Pat. No. 2,397,905, the disclosure of which is incorporated herein by reference. Here however, a costly and expensive pivotable woodruff key is required to lock a thrust collar onto external splines of the mainshaft to prevent a gear from moving axially.

An example of a splined thrust washer for transmitting axial thrust from a gear set to a propeller drive shaft is disclosed in U.S. Pat. No. 3,984,621, the disclosure of which is incorporated herein by reference. Here, a splined thrust washer (52) is slid along the shaft splines to a transverse groove adjacent a stepped shoulder on the shaft and is held in place against the shoulder by a splined collar (30). Thrust washer (52) is operative to transmit axial thrust of only one gear to the propeller shaft and in addition to requiring the use of a collar (30), also requires costly and complex machining of a stepped configuration to the Propeller shaft exterior.

A more recent example of a transmission mainshaft gear retainer for preventing axial movement of two closely spaced gears to prevent transfer of axial thrust force therebetween is disclosed in U.S. Pat. No. 4,034,620, the disclosure of which is incorporated herein by reference. Here, a thrust ring (104) is splined to the mainshaft between two adjacent gears and is held in place by means of snap rings (108, 110) on opposite sides thereof. The gears are further required to have costly and complex mating tongue and groove configurations that operate in conjunction with additional snap ring (102) to limit movement of the gears away from each other.

An even more recent example of a three thrust washer combination for transmitting axial thrust imparted to a mainshaft gear to the mainshaft and upon which the present improvement is founded is disclosed in U.S. Pat. No. 4,949,589, assigned to the assignee of the present invention and the disclosure of which is incorporated herein by reference. Here however, all three washers require relatively large width transverse grooves for their axial containment in the outer surface of the mainshaft that are substantially the same.

The present invention addresses a problem concerning interchangability between the retainer rings and the thrust washer to insure that neither of the retainer rings is inadvertently placed in the thrust ring groove and that the thrust washer is not inadvertently placed in either the retainer ring grooves.

The present invention also overcomes such shortcomings by insuring the adjacent transmission mainshaft gears do not contact each other while one is being clutched to the mainshaft in addition to making the pair of retainer rings interchangeable with each other as well as rendering it impossible to place a retainer ring in the thrust washer groove and to place the thrust washer in either of the retainer ring grooves.

SUMMARY OF THE INVENTION

Accordingly, it is an object of this invention to provide a transmission mainshaft thrust washer and retainer ring combination that is operative to transfer axial thrust to the mainshaft rather than to a gear adjacent to a gear being clutched to the mainshaft.

It is another object of this invention to provide a transmission thrust washer and retainer ring combination that prevents adjacent mainshaft gears from contacting each other while one of the gears is being clutched to the mainshaft.

It is still another object of this invention to provide a transmission mainshaft thrust washer and retainer ring combination that prevents the retainer ring from being inadvertently placed in the thrust washer groove and prevents the thrust washer from being inadvertently placed in either of the retainer ring grooves.

DESCRIPTION OF SOME PREFERRED EMBODIMENTS

Figure 1:
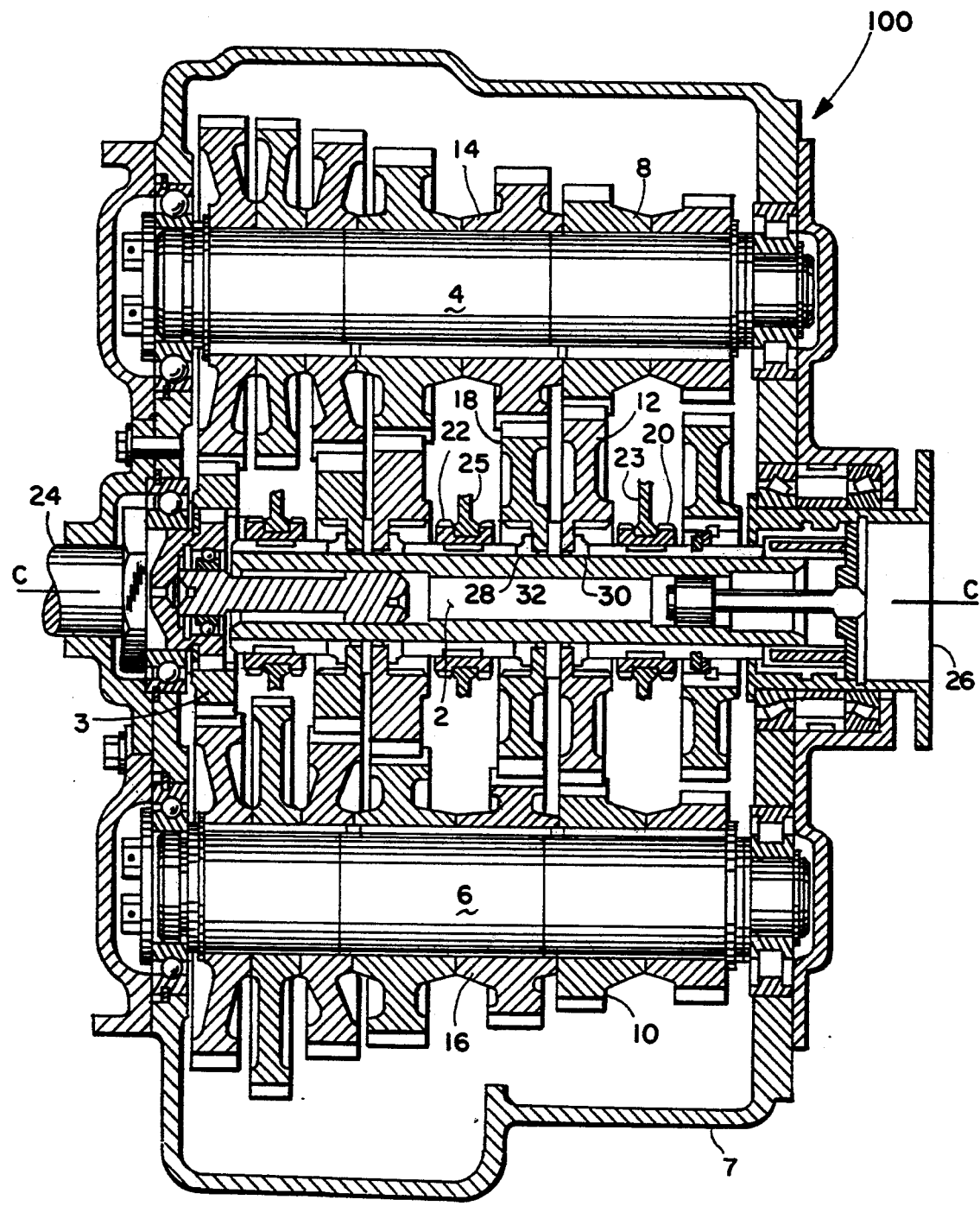
FIG. 1 is a central cross-sectional view of a vehicular transmission 100 having a mainshaft 2 that utilizes the retainer ring and thrust washer combination of the invention.

Transmission 100 in FIG. 1 is a vehicular twin countershaft transmission having a pair of countershafts 4 and 6 respectively disposed in parallel spaced relationship on opposite sides of a mainshaft 2.

Mainshaft 2 and countershafts 4 and 6 are journaled for rotation on housing 7 of transmission 100.

An input shaft 24 driven by the vehicle's engine rotates gear 3 which in turn drives countershafts 4 and 6 which causes countershaft gears 8 and 10 to rotate mainshaft gear 12 and countershaft gears 14 and 16 to rotate mainshaft gear 18 about mainshaft 2.

Mainshaft gears 12 and 18 float about mainshaft 2 until selectively clutched thereto by clutch mechanisms 20 and 22 respectively which then causes mainshaft 2 to rotate and drive an output shaft 26 operatively connected to the vehicle's drive wheels such as through a differential assembly.

Mainshaft 2 is rotated at speeds determined by the gear ratio between the particular mainshaft and countershaft gear combination selectively clutched to the mainshaft.

Figure 2:
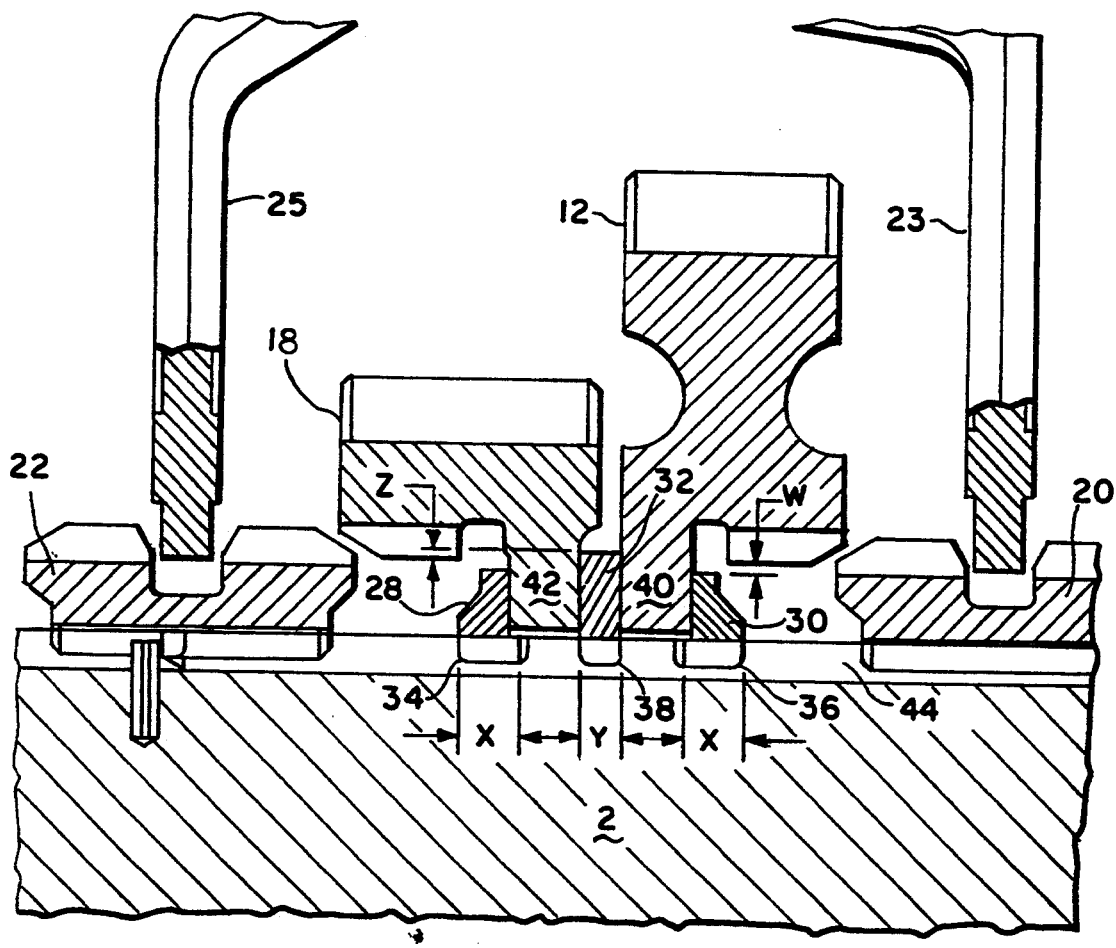
FIG. 2 is an enlarged portion of the cross-sectional view of transmission 100 of FIG. 1.

Clutch assemblies 20 and 22 are spliningly connected to longitudinally extending splines about the outer periphery of mainshaft 2 referenced by numeral 44 in FIG. 2 and thus rotate in unison with mainshaft 2.

Clutch mechanisms 20 and 22 are selectively moved in opposite axial directions by lever arms 23 and 25 and have teeth that meshingly engage with inner teeth on gears 12 and 18 (not referenced).

In FIG. 2, adjacent mainshaft gears 12 and 18 have respective flanges 40 and 42 that extend radially inwardly towards mainshaft 2. Flanges 40 and 42 have adjacent annular surfaces that face axially towards each other along mainshaft 2 and respective annular surfaces on respective opposite sides that face axially away from each other along mainshaft 2 referenced in FIG. 2.

A thrust washer 32 is disposed in transverse groove 38 in mainshaft 2 between the facing annular surfaces of flanges 40 and 42 of mainshaft gears 12 and 18 respectively.

Although the axial width of thrust washer 32 is less than the axial width of groove 38 by an amount sufficient to enable thrust washer 32 to be received into groove 38 with a predetermined axial clearance, for simplicity, the axial width of both groove 38 and thrust washer 32 are both referenced by the letter "Y" in FIG. 2.

Figure 4:
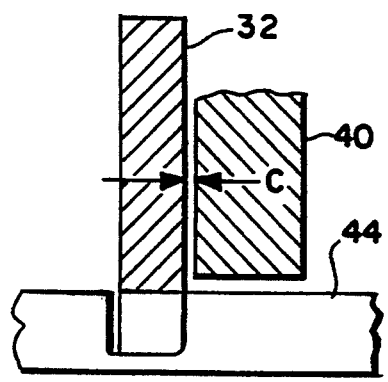
FIG. 4 is a cross-sectional view of flange 40 and thrust washer 32 of FIG. 2.

Further, the axial width "Y" of thrust washer 32 and groove 38 is such that when thrust washer 32 is urged axially in either direction during the clutching process, it will abut against one or the other of the groove's side walls and remain separated from the annular flange surface towards which it is being urged by a predetermined axial clearance referenced by the letter "C" in FIG. 4 and of which about 0.0065 inch clearance is preferred.

Retainer rings 28 and 30 are received in annular retainer ring grooves 34 and 36 respectively and have substantially equivalent axial widths referenced by letter "X". A portion of each retainer ring such as retainer ring 30 shown in FIG. 3 have a depth within groove 36 referenced by letter "D" with the axial width of retainer ring 30 within groove 36 having a depth "D" being less than the axial width of groove 36 by a predetermined clearance enabling retainer ring 30 to be received into groove 36.

Although the axial width of groove 36 is larger than the axial width of ring 30 by a predetermined clearance, for simplicity, the axial width of both groove 36 and the portion of retainer ring 30 having depth "D" are both referenced by letter "X".

As referenced in FIG. 2, the axial width "X" of both retainer rings 28 and 30 are substantially the same and greater than the axial width "Y" of groove 38 so that retainer rings 28 and 30 are interchangeable with each other yet neither are interchangeable with thrust washer 32 since the axial width "Y" of groove 38 is too narrow.

Both retainer rings 28 and 30 are provided with an offset on the side thereof facing towards the gear flange such as referenced by the letter "0" in FIG. 2.

Offset "0" provides an axial width referenced by letter "A" for the remaining portion of the retainer rings above that portion referenced by letter "D" that is narrower than axial width "X" and for which a preferred offset is about 0.047 inch.

As shown in FIG. 2, offset "0" causes a portion of each retainer ring having depth "D" to extend axially between mainshaft 2 and the end of flanges 40 and 42 facing theretoward.

Figure 3:
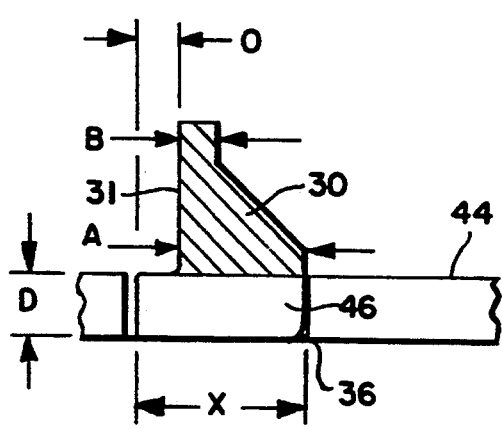
FIG. 3 is a cross-sectional view of a retainer ring 30 shown in FIGS. 2 and 3.

As shown in FIGS. 2 and 3, the depth "D" is preferably not more than the radial depth of the grooves between splines 44 extending longitudingly along mainshaft 2.

Although retainer rings 28 and 30 preferably have the irregular cross-section shown in FIGS. 1-3 by having a tapered surface facing away from the gear flange that reduces the axial width from "A" to that referenced by letter "B" in FIG. 3, it may have any suitable cross section provided it has an annular upright surface referenced by numeral 31 that is substantially parallel to the annular gear flange surface facing theretoward for contact engagement therewith as well as having an offset "0" and an axial width "X" of a portion within the retainer ring groove that is larger than axial width "Y" of thrust washer groove 38.

The radial height of thrust washer 32 is preferably more than the radial distance of the internal teeth of the mainshaft gears 12 and 18 by an amount referenced by numeral "Z" as shown in FIG. 2 as an added precaution to prevent thrust washer 32 from being inserted into retainer ring grooves 34 and 36. Thus the outer diameter of thrust washer 32 is sufficient larger than the inner diameter of the mainshaft gears to create an interference therewith and prevent thrust washer 32 from being received in either groove 36 or 38. The radial height of retainer rings 28 and 30 is less by an amount referenced by the letter "W" in FIG. 2 than the radial distance of the inner teeth of gears 12 and 18 from mainshaft 2 to enable retainer rings 28 and 30 to be received into grooves 34 and 36 respectively. Thrust washer 32 and retainer rings 28 and 30 preferably have a splined inner periphery about central openings theretoward that register with the mainshaft splines so that they can be spliningly connected to the mainshaft and rotate in unison therewith.

The thrust washer and retainer ring combination of the invention thus insures that the position of the thrust washer cannot be interchanged with the thrust washer position and vice versa to prevent mis-assembly from occurring.

What is claimed is:

1. A transmission mainshaft thrust washer and retainer ring combination of the type wherein radially inward extending flanges of a pair of adjacent mainshaft gears selectively clutchable with the mainshaft are prevented from moving axially away from each other by first and second retainer rings respectively disposed in annular grooves adjacent sides of the respective gear flanges which face away from each other and are prevented from moving axially towards each other by a thrust washer disposed in an annular groove in the mainshaft between sides of the respective gear flanges which face towards each other and operative to transmit axial thrust to the mainshaft during the process of clutching the respective gears thereto, wherein the improvement is characterized by;

the first and second retainer rings being interchangeable with each other but not with the thrust washer as a result of both retainer ring grooves having respective axial widths that are substantially the same with each other and wider than the axial width of the thrust washer groove axial width so as to accommodate an offset in the side of the respective rings facing towards the mainshaft gear flanges resulting in a portion of each retainer ring having an axial width within the retainer ring groove that is larger than both the axial width of the thrust washer groove and a remaining portion of the retainer ring.

2. The retainer ring and thrust washer combination of claim 1 wherein the thrust washer is further prevented from interchangability with the retainer rings by having an outer diameter that is larger than the retainer ring diameter by an amount effective to create an interference with internal teeth on the mainshaft gears and operative to be meshingly engaged with teeth of a clutch mechanism operative to engage the gear with the mainshaft for rotation therewith.

* * * * *